United States Patent [19]

Kagawa et al.

[11] Patent Number: 4,530,151
[45] Date of Patent: Jul. 23, 1985

[54] MANUFACTURE METHOD OF A SODIUM-SULFUR STORAGE BATTERY

[75] Inventors: Hiroshi Kagawa; Suminobu Iwabuchi, both of Takatsuki, Japan

[73] Assignee: Yuasa Battery Co., Ltd., Osaka, Japan

[21] Appl. No.: 515,147

[22] Filed: Jul. 19, 1983

[30] Foreign Application Priority Data

Jul. 19, 1982 [JP] Japan .................... 57-126477

[51] Int. Cl.³ .................... H01M 6/00; B23K 31/02
[52] U.S. Cl. .................... 29/623.1; 429/104; 228/234; 228/263.12; 228/263.17
[58] Field of Search .............. 228/239, 263.12, 263.17; 429/104; 29/623.1

[56] References Cited

U.S. PATENT DOCUMENTS

| | | | |
|---|---|---|---|
| 3,070,875 | 1/1963 | Feduska | 228/263.17 X |
| 3,296,692 | 1/1967 | Griffin | 228/234 X |
| 4,037,027 | 7/1977 | Despplanches et al. | 429/104 |
| 4,236,661 | 12/1980 | Dunn et al. | 29/623.2 X |
| 4,245,012 | 1/1981 | Mikkor | 429/104 |
| 4,419,418 | 12/1983 | Knodler et al. | 429/104 |

OTHER PUBLICATIONS

Klomp, "Solid State Bonding of Metals to Ceramics".
Lin, "Fluxless Induction Brazing of Aluminum in Air", *Welding Research Supplement*, pp. 51–54, Feb. 1977.

*Primary Examiner*—Brian E. Hearn
*Assistant Examiner*—Stephen J. Kalafut
*Attorney, Agent, or Firm*—Armstrong, Nikaido, Marmelstein & Kubovcik

[57] ABSTRACT

The present invention discloses a manufacturing method of a sodium-sulfur storage battery comprising battery components of metallic members jointed by means of a thermocompression method to an α-alumina ring which is jointed to a sodium ion conductive solid electrolytic tube using solder glass. According to the invention, thicknesses of the metallic members thermocompressively jointed to upper and lower surfaces of said α-alumina ring is in a range from about 0.2 mm to about 0.6 mm. Plate-shaped aluminum rings are disposed between said α-alumina ring and said metallic members respectively and are thermocompressively jointed in air under condition of a temperature in a range from about 600° to about 625° C. and a pressure in a range from about 1200 to about 1600 kg/cm².

6 Claims, 3 Drawing Figures

MANUFACTURE METHOD OF A SODIUM-SULFUR STORAGE BATTERY

BACKGROUND OF THE INVENTION

This invention relates to a manufacturing method of a storage battery of the sodium-sulfur type by means of the thermocompression jointing method.

A storage battery of this type is a secondary battery of a high-temperature type and has been disclosed in U.S. Pat. No. 4,076,902. In such battery, sodium is utilized as an anodic reactant and sulfur or sodium polysulfide is utilized as a cathodic reactant, and they are separated by sodium ion conductive solid electrolytic tube to be actuated at a high temperature of about 300° to 350° C. Since both reactants are in molten state, it is necessary to completely seal the battery. In order to completely separate the reactants arranged internal and external sides of the solid electrolytic tube and to electrically insulate the cathode and anode, an α-alumina ring is jointed to an upper open end of the solid electrolytic tube by the use of solder glass, and metallic members of cathode and anode are separately jointed to said α-alumina ring. Jointing method of this case has been the thermocompression jointing method, in which the α-alumina and the metal have been connected and jointed by being applied pressure under heated condition. It has been known that firm junction can be obtained when the α-alumina and the metal are heated to approximately above 630° C. with an aluminum O-ring therebetween under environment of vacuum or inert gas, subjected to pressure of about 200 kg/cm$^2$ to 500 kg/cm$^2$, and kept for more than about 20 minutes under these conditions. However, the above-mentioned conditions have a primary disadvantage that workability is extremely bad and productivity is poor because the work must be done under the environment of the vacuum or the inert gas. Further disadvantage is that firm junction is obtainable only in a part of the members even in case of jointing a columnar metal of small size for example as small as 10 mm in diameter, and thus, any junction is not obtained to cause easy peeling off in case of jointing a ring-shaped α-alumina of large size, for example as large as 50 mm in diameter, to a ring-shaped metal of the same diameter. Still further disadvantage is that, when the pressure is applied to an O-ring-shaped aluminum to deform it, it is not deformed uniformly and jointed positions are not stable.

This invention is intended to obviate all of the above mentioned disadvantages and to determine various conditions for thermocompression jointing useful practical use. First of all, this invention is intended to determine the conditions to obtain sound and uniform thermocompression jointing to a large α-alumina ring in air for the purpose of improving productivity and at the same time simplifying a thermocompression jointing equipment.

DETAILED DESCRIPTION OF THE PREFERRED EMBODIMENT

Figure 1:
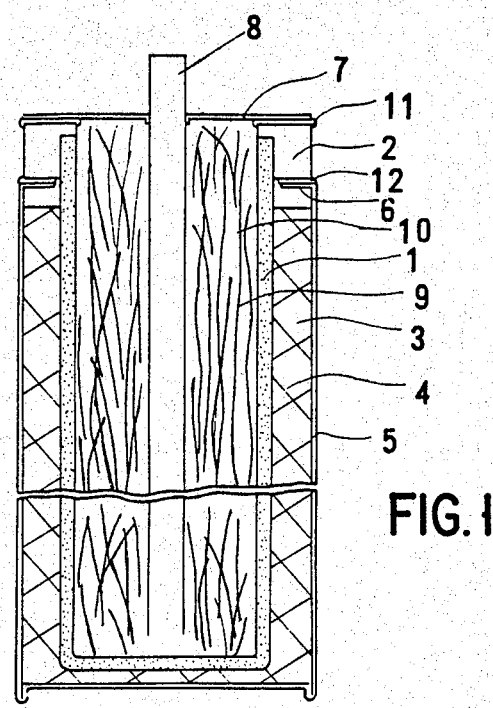
FIG. 1 is a sectional view of a sodium-sulfur storage battery according to an embodiment of the present invention.

In case of thermocompression jointing in air, prevention of oxidation of metal can be achieved by following conditions. Aluminum disposed between the metal member and the α-alumina ring is a plate-shaped ring. An inside diameter of the aluminum ring is smaller than or equivalent to an inside diameter of a metal ring of thermocompression jointing portion. An outside diameter of the aluminum ring is large than or equivalent to an outside diameter of the jointing portion. The ring is designed to adhere closely to a jointing surface of the metal member. It has been made sure, as a means for obtaining the close adherence, that at least oxidation of the jointing surface can be avoided even in air, if a vertical width of jointed portion of a thermocompression jointing jig was determined as (a+2b+2c) mm; where a(mm) was a thickness of the α-alumina ring, b(mm) was a thickness of each plate-shaped aluminum ring, and c(mm) was a thickness of each metal member; or if a pressure of less than about 150 kg/cm$^2$ was applied to the thermocompression jointing jig. It has been made clear that, under a pressure of more than 150 kg/cm$^2$, compressive deformation has occured before the ring was thermocompressively jointed and thus desired jointing strength has not been obtained. In order to determine the thermocompression jointing conditions conforming to practical use, tests were performed by the use of an α-alumina ring having an outside dia. of 50 mm, an inside dia. of 37 mm, and a thickness of 8 mm; metal members respectively having outside dias. of 55 mm, inside dias. of 39.55 mm, and thicknesses of 0.5 mm; and plate-shaped aluminum rings respectively having outside dias. of 55 mm, inside dias. of 39 mm, thicknesses of 103 μ, and purity of more than 99.99%. It was found as the results that, as shown in Table-1, conditions for providing the large α-alumina ring with uniform and sound jointing performance having excellent air-tightness were that temperature was about 600° C. to 625° C., pressure was about 1200 kg/cm$^2$ to 1600 kg/cm$^2$, and time was more than about 3 minutes and less than about 12 minutes. Under conditions other than mentioned above, jointing performance between the aluminums, the metals and the α-alumina was incomplete. Or the aluminums did not joint with the α-alumina due to extinction of aluminum layer as a result of excessive diffusion of aluminum into the metal side.

TABLE 1

| Temp. (°C.) | Press (kg/cm$^2$) | Time (min) 2 | 3 | 12 | 20 | Judgement of jointing performance and air-tightness |
|---|---|---|---|---|---|---|
| 590 | 1000 | X | X | X | Δ | O: Both are good. |
| | 1200 | X | Δ | Δ | Δ | Δ: Only air-tightness |
| | 1600 | X | Δ | Δ | Δ | is good. |
| | 1700 | X | X | Δ | Δ | X: Both are bad. |
| 600 | 1000 | Δ | Δ | Δ | Δ | |
| | 1200 | Δ | O | O | Δ | |
| | 1600 | Δ | O | O | Δ | |
| | 1700 | X | Δ | Δ | X | |
| 625 | 1000 | Δ | Δ | Δ | X | |
| | 1200 | Δ | O | O | Δ | |
| | 1600 | Δ | O | O | Δ | |
| | 1700 | X | X | Δ | X | |
| 630 | 1000 | Δ | Δ | Δ | X | |
| | 1200 | X | Δ | Δ | X | |
| | 1600 | X | Δ | Δ | X | |
| | 1700 | X | X | X | X | |

In order to make further clear the thermocompression jointing performance such as uniform jointing state, air-tightness, and connecting force etc., thermocompression jointing conditions of this invention will be described supplementally hereunder. It was found through experiments that, if the thickness of the metal member jointed to the α-alumina ring was thin, a thickness of non-diffusion layer became thin to decrease mechanical strength therof as a result of counter diffusion with aluminum at the time of jointing. On the other hand, it was found that if its thickness was thick, when the metal was cooled after being jointed, thermal strain remained to cause breakage of the α-alumina ring into ring shapes due to even a slight mechanical shock or local thermal shock. It was confirmed as the result that an optimum thickness of the metal member was about 0.2 mm to 0.6 mm. Further, concerning the prevention of oxidation of the metallic member at the time of thermocompression jointing, when the metals were heated to the prescribed temperature under pressure of 0 kg/cm² with fixing the vertical width of the jointing jigs between which the members and rings were disposed, after a pressure of several kg/cm² is temporarily applied for the purpose of correcting deformation of the metal members etc., the close adherence was maintained and oxidation was avoided because pressure was applied on the metal members etc. owing to thermal expansion of the jigs and jointing members even if pressure was not applied from outside. Pressure generated by the thermal expansion at a temperature of about 600° C. is preferably below about 200 kg/cm². As mentioned above, at a pressure of more than 200 kg/cm² the plate-shaped aluminum rings will make progress in counter diffusion with metal other than being compressively deformed before the prescribed pressure has been applied, so that desired thicknesses of the aluminum can not be obtained to cause insufficient connecting strength and lack of air-tightness. Further, tests were conducted on the plate-shaped aluminum rings, which were to be diffusedly jointed to both α-alumina and metal members, with respect to the purity and the thickness etc. giving influences on thermocompression jointing performance, air-tightness, durability etc. It was found from the results that the purity should be more than 97.5%; preferably more than 99.99%, that a purity of less than this value would cause a decrease in connecting force and insufficient air tightness on some places, and that explosure thereof to acidic or sulfuric environment for a long time would cause deterioration of strength. The thickness thereof is preferably about 100 to 150 μm before jointing, and a thickness of less than 100 μm would cause a decrease in connecting force and insufficiency in air-tightness because of deformation due to applied pressure at the time of thermocompression jointing, thus leading to extreme thinning of an aluminum layer which is to be left as an intermediate layer after being jointed. A thickness of about 30 to 80 μm is preferable after completion of jointing. Further, a thickness of more than 150 μm before jointing would cause continueing deformation due to applied pressure at the time of thermocompression jointing to produce crack attributable to slip at a boundary surface between the aluminum of the jointed portion and that of non-jointed portion, produce an area in which aluminum is lacking locally, and cause/insufficiency in connecting force and air-tightness.

Figure 2:
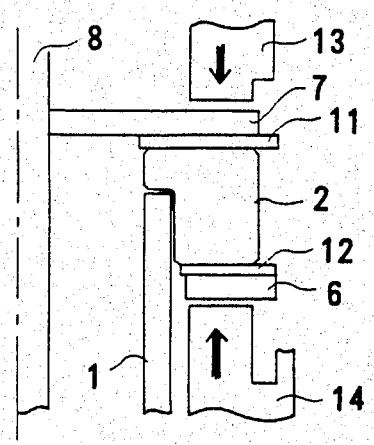
FIG. 2 is a sectional partial view of the battery before the thermocompression jointing.
Figure 3:
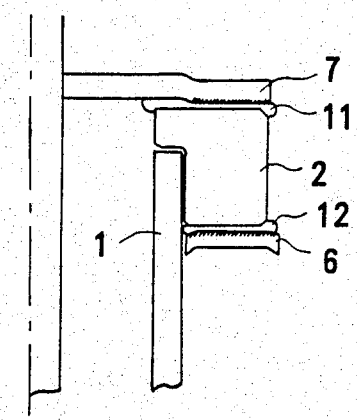
FIG. 3 is a sectional partial view of the battery after the thermocompression jointing.

An object of this invention is to provide a most complete jointing performance under the state satisfying the above mentioned thermocompression jointing conditions. An example of sodium-sulfur storage battery manufactured under the thermocompression jointing condition of this invention will be described hereunder. Refer 1 is a sodium ion conductive solid electrolytic tube e.g. β"-alumina. 2 is an α-alumina ring jointed to the solid electrolytic tube 1 by solder glass, which has an outside diameter of about 50 mm and an inside diameter of 37 mm (the smallest inside diameter is 31 mm). 3 is sulfur or polysulfide which serves as the cathodic reactant. 4 is an cathodic electroconductive material consisting of fiber, such as a graphite, carbon or the like, impregnated with the cathodic reactant. 5 is a battery housing made of molten sulfur resisting metal such as stainless steel coated with anti-corrosive layer, which also functions as the cathodic current collector. The cathodic electroconductive material 4 is in compressively close adherence to both surfaces of the solid electrolytic tube 1 and the battery housing 5 with the cathodic reactant 3 being under molten state. 6 is an cathodic cover comprising sulfur resisting metal such as Fe-25Cr-4Al having an outside diameter of 55 mm, an inside diameter of 40 mm, and a thickness of 0.4 mm. 7 is a molten sodium resisting anodic cover such as SUS316L material having an outside diameter of 50 mm, an inside diameter of 6 mm, and a thickness of 0.3 mm. 8 is a anodic current collector terminal comprising a copper tube having an inside diameter of 4 mm coated with SUS304 having an outside diameter of 6 mm and a thickness of 0.3 mm, which also serves for charging and discharging the anodic reactant and is welded to the anodic cover 7. 9 is a molten sodium resisting metallic fiber such as, for example, Fe or SUS316L having fiber diameter of 8 μm–20 μm. 10 is sodium functioning as the anodic reactant, which is impregnated in the metallic fiber 9 and discharged from an inside of the metallic fiber 9 through the solid electrolytic tube 1 to an cathodic chamber when the storage battery is discharged. On the other hand, when the storage battery is charged, this sodium returns from the cathodic chamber through the solid electrolytic tube 1 to a anodic chamber, and is impregnated in and maintained by the metallic fiber 9. 11 is a plate-shaped aluminum ring having an outside diameter of 51 mm and an inside diameter of 30 mm, which comprises an aluminum foil having a purity of 99.99% and a thickness of about 103 μm. 12 is a plate-shaped aluminum ring (cathodic side) of the same material with that of the plate-shaped aluminum ring (anodic side), and having an outside diameter of 55 mm and an inside diameter of 39 mm. FIG. 2 shows a method for thermocompressively jointing the anodic cover 7 and the cathodic cover 6 to the α-alumina ring 2 in order to obtain the composition of storage battery as shown in FIG. 1. In FIG. 2, 13 is an upper pressing portion of a thermocompression jointing jig and comprises SUS304. 14 is a lower pressing portion of the thermocompression jointing jig, comprising SUS304 samely. Above-mentioned each component was arranged as shown in FIG. 2, and the pressing portions 13, 14 of the thermocompression jointing jig were closely adhered to jointing surfaces of the anodic cover 7 and the cathodic cover 6 respectively. Being heated up to about 610° C. at a heating rate of about 10° C./min under the closely adhered condition, the jointing portions were applied with a pressure of about 150 kg/cm² at this retained temperature due to thermal expansions of the jig (13, 14) and other, thus oxidation on the jointing surfaces of the anodic cover 7 and the cathodic cover 6 is prevented. In the next process, the jigs (13, 14) were applied with a pressure of about 1400 kg/cm² from outside by means of hydraulic press etc. under the temperature retained condition and held at this state for about six minutes, then the temperature is lowered, and finally the applied pressure was released at the time when the temperature was lowered to about 530° C. FIG. 3 shows the thermocompressively jointed state thus obtained, and hatched portions on the jointing surfaces of the anodic cover 7 and the cathodic cover 6 show interdiffusion layers with the aluminum and function to retain jointing performance with the metallic member. When thicknesses of these interdiffusion layers are considerably thick as compared with a thickness of a metal matrix, mechanical strengthes thereof will be weakened to cause peeling off. While, a binding layer considered as an oxide binding layer with the aluminum lies also on a jointing surface of the α-alumina ring 2 to take jointing action with the aluminum layer. Further, the thicknesses of the plate-shaped aluminum rings 11, 12 were decreased to about 50 μm, and decreased quantities thereof were utilized for inter-diffusion with the metal and the α-alumina and at the same time were pressed out thereabout. As for the cathode in this instance, it is necessary to prevent the pressed-out aluminum from contacting with the surface of the solid electrolytic tube 1, or to remove it if the aluminum contacts with the surface. This is for the reason that the contact therebetween would give an electric potential on that part of the solid electrolytic tube to cause breakage of the solid electrolytic tube 1 due to local application of electric voltage. Therefore, it is necessary to prevent the cathodic cover 6 from contacting with the solid electrolytic tube 1 from the same reason.

The thermocompression jointing seal thus obtained as mentioned above has an excellent helium tightness and extremely good reliability.

In this invention, the materials of the cathodic cover and the anodic cover which are thermocompressively jointed may be substituted for others, such as Fe, Fe coated with Al etc. The shape of α-alumina ring, the shape of metallic cover, the jointing time, and the shape of the battery etc. are not specially defined.

What is claimed is:

1. A method for manufacturing a sodium-sulfur storage battery having an alpha-alumina ring jointed with solder glass to a sodium ion conductive solid electrolyte tube, a cathodic cover of sulfur-resistant metal and an anodic cover of molten sodium-resistant metal, the cathodic and anodic covers each having a thickness in the range from 0.2 mm to 0.6 mm and each being thermocompressively jointed to respective lower and upper surfaces of the alpha-alumina ring, the method further comprising the steps of:

disposing first and second plate-shaped aluminum rings between the lower and upper surfaces of the alpha-aluminum ring an the cathodic and anodic covers respectively; and in air and at a temperature in the range from 600° C. to 625° C., thermocompressively jointing the cathodic and anodic covers to the alpha-aluminum ring with an applied jointing pressure in the range from 1200 to 1600 kg/cm².

2. The method according to claim 1 wherein the first and second plate-shaped aluminum rings each have a purity of at least 97.5% and a thickness in the range from 100 μm to 150 μm before thermocompresive jointing and a thickness after thermocompressive jointing in the range from 30 μm to 80 μm.

3. The method according to claim 1 wherein the first and second plate-shaped aluminum rings each have an inside diameter less than or equal to respective inside diameters of the cathodic and anodic covers, and an outer diameter greater than or equal to respective outer diameters of the cathodic and anodic covers.

4. A method for manufacturing a sodium-sulfur storage battery having an alpha-alumina ring jointed with solder glass to a sodium ion conductive solid electrolyte tube, a cathodic cover of sulfur-resistant metal and an anodic cover of molten sodium-resistant metal, the cathodic and anodic covers each having a thickness in the range from 0.2 mm to 0.6 mm and each being thermocompressively jointed to respective lower and upper surfaces of the alpha-alumina ring, the method further comprising the steps of:

disposing first and second plate-shaped aluminum rings between the respective lower and upper surfaces of the alpha-alumina ring and the cathodic and anodic covers, respectively;

in air, pressing the cathodic and anodic covers and the first and second plate-shaped aluminum rings to the respective lower and upper surfaces of the alpha-alumina ring between lower and upper pressing means with an applied pressure not exceeding 150 kg/cm²;

in air, heating the alpha-alumina ring, the cathodic and anodic covers and the first and second plate-shaped aluminum rings pressed therebetween while applying pressing pressure thereto not exceeding 200 kg/cm²; and in air, continuing to heat the alpha-alumina ring, the cathodic and anodic covers and the first and second plate-shaped alumium rings pressed therebetween until the temperature thereof increases to 600° C., whereupon the applied pressure thereon is increased to a pressure in the range from 1200 to 1600 kg/cm² to produce thermocompressive jointing.

5. The method according to claim 4, wherein the first and second plate-shaped aluminum rings each have a purity of at least 97.5%, a thickness before thermocompressive jointing in the range from 100 μm to 150 μm, and a thickness after thermocompressive jointing in the range from 30 μm to λμm.

6. The method according to claim 4, wherein the first and second plate-shaped aluminum rings each have an inner diameter less than or equal to respective inner diameters of the cathodic and anodic covers, respectively, and an outer diameter greater than or equal to respective outer diameters of the cathodic and anodic covers, respectively.

* * * * *